(12) United States Patent
Frohwein et al.

(10) Patent No.: US 11,861,592 B1
(45) Date of Patent: Jan. 2, 2024

(54) SYSTEM, METHOD AND COMPUTER READABLE STORAGE FOR ENABLING AN INSTANTANEOUS INSTRUMENT

(71) Applicant: AMERICAN EXPRESS KABBAGE INC., Atlanta, GA (US)

(72) Inventors: Rob Frohwein, Atlanta, GA (US); Kathryn Petralia, Atlanta, GA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 177 days.

(21) Appl. No.: 14/991,888

(22) Filed: Jan. 8, 2016

(51) Int. Cl.
| G06Q 20/34 | (2012.01) |
| G06Q 20/20 | (2012.01) |
| G06Q 20/32 | (2012.01) |
| G06Q 20/40 | (2012.01) |
| G06Q 40/03 | (2023.01) |

(52) U.S. Cl.
CPC .......... *G06Q 20/34* (2013.01); *G06Q 20/204* (2013.01); *G06Q 20/3278* (2013.01); *G06Q 20/351* (2013.01); *G06Q 20/354* (2013.01); *G06Q 20/409* (2013.01); *G06Q 40/03* (2023.01)

(58) Field of Classification Search
CPC ............. G06Q 20/204; G06Q 20/3278; G06Q 20/351; G06Q 20/354; G06Q 20/409; G06Q 40/025
See application file for complete search history.

(56) References Cited

U.S. PATENT DOCUMENTS

| 7,054,842 B2 * | 5/2006 | James | G06Q 20/10 705/39 |
| 9,858,567 B2 * | 1/2018 | Stanfield | G06Q 20/24 |
| 11,315,137 B1 * | 4/2022 | Kurani | G06Q 20/3223 |
| 11,423,395 B1 * | 8/2022 | Kurani | G06Q 20/3676 |
| 2008/0058014 A1 * | 3/2008 | Khan | H04L 63/0853 455/558 |
| 2009/0281945 A1 * | 11/2009 | Shakkarwar | G06Q 20/405 705/40 |
| 2010/0057609 A1 * | 3/2010 | Sibson | G06Q 20/102 705/40 |
| 2010/0094735 A1 * | 4/2010 | Reynolds | G06Q 20/102 705/34 |
| 2010/0211498 A1 * | 8/2010 | Aabye | G06Q 20/10 705/39 |

(Continued)

FOREIGN PATENT DOCUMENTS

WO    WO 02/05165 A1 *  1/2002 ............. G06Q 40/00

OTHER PUBLICATIONS

Anonymous, "ApplePay May Interfere With Rewards" as found on www.FlyerTalk.com which was archived by web.archive.org on Oct. 24, 2014 (Year: 2014).*

(Continued)

*Primary Examiner* — Asfand M Sheikh
(74) *Attorney, Agent, or Firm* — Thomas Horstemeyer, LLP

(57) ABSTRACT

A method, apparatus, and computer readable storage to implement an issuance of a virtual credit card. The virtual credit card can be issued instantaneously and can thereafter be associated with a physical credit card. The virtual credit card and the physical credit card can be serviced by the same account at the same bank.

17 Claims, 6 Drawing Sheets

(56) References Cited

U.S. PATENT DOCUMENTS

| | | | | |
|---|---|---|---|---|
| 2010/0312704 A1* | 12/2010 | Rohatgi | | G06Q 20/40 |
| | | | | 705/44 |
| 2011/0302084 A1* | 12/2011 | Melik-Aslanian | | |
| | | | | G06Q 20/3555 |
| | | | | 705/44 |
| 2012/0066043 A1* | 3/2012 | Carmichael | | G06Q 20/40 |
| | | | | 705/14.23 |
| 2012/0280035 A1* | 11/2012 | Liu | | G06Q 20/02 |
| | | | | 235/493 |
| 2012/0290449 A1* | 11/2012 | Mullen | | G06Q 10/00 |
| | | | | 705/27.2 |
| 2013/0103581 A1* | 4/2013 | Barry | | G06Q 20/351 |
| | | | | 705/42 |
| 2014/0188704 A1* | 7/2014 | Grossman | | G06Q 20/354 |
| | | | | 705/39 |
| 2014/0214665 A1* | 7/2014 | Lee | | G06Q 20/353 |
| | | | | 705/41 |
| 2015/0019355 A1* | 1/2015 | Russell | | G06Q 20/204 |
| | | | | 705/17 |
| 2015/0220928 A1* | 8/2015 | Allen | | G06Q 20/3829 |
| | | | | 705/67 |
| 2015/0262291 A1* | 9/2015 | West | | G06Q 40/025 |
| | | | | 705/14.66 |
| 2015/0339659 A1* | 11/2015 | Ballesteros | | G06Q 20/38215 |
| | | | | 705/76 |
| 2016/0132866 A1* | 5/2016 | Gui | | H04L 67/306 |
| | | | | 705/35 |
| 2016/0292673 A1* | 10/2016 | Chandrasekaran | | |
| | | | | G06Q 20/3674 |
| 2017/0046489 A1* | 2/2017 | Hade | | G16H 40/20 |
| 2020/0265419 A1* | 8/2020 | Wu | | G06Q 20/381 |

OTHER PUBLICATIONS

Alaeddin, Omar, et al. "From physical to digital: Investigating consumer behaviour of switching to mobile wallet." Polish Journal of Management Studies 17.2 (2018): 18-30. (Year: 2018).*

Modupalli, Jagannatha. Extending Mobile Wallet That Utilizes NFC. MS thesis. 2016. (Year: 2016).*

* cited by examiner

Jane Smith
3 Oak Street
Hicksville, NY 11730
(215) 555-1212
ACME Bank Visa Card
Account No. 4211 4200 4059 8589
Credit Line:$10,000
Current balance: $3,500
Credit remaining: $6,500
Next Payment minimum; $55
Next payment due: Dec 10, 2015

| Date | Description | Amount | Source |
|---|---|---|---|
| 11/25/2015 | Amazon.com | $20.79 | Virtual |
| 11/26/2015 | Joe's Piza | $12.30 | Physical |
| 11/28/2015 | Google Music | $9.99 | Virtual |
| 11/29/2015 | Seers Inc. | $124.0 | Physical |

[expand]

SYSTEM, METHOD AND COMPUTER READABLE STORAGE FOR ENABLING AN INSTANTANEOUS INSTRUMENT

BACKGROUND OF THE INVENTION

Field of the Invention

The present general inventive concept is directed to a method, apparatus, and computer readable storage medium directed to method, apparatus, and computer readable storage to implement applying for and receiving an instantaneous virtual card with is then associated with a physical card.

Description of the Related Art

People in need of a financial account (e.g., credit card, debit card, etc.) can apply electronically and receive an instant decision. However, a user may be limited in what the user can do with the account until a physical card arrives in the mail.

SUMMARY OF THE INVENTION

It is an aspect of the present invention to provide an improved instant account system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 4 is a drawing of a credit card statement combining charges from both the physical and virtual card, according to an embodiment;

DESCRIPTION OF THE PREFERRED EMBODIMENTS

Figure 1:
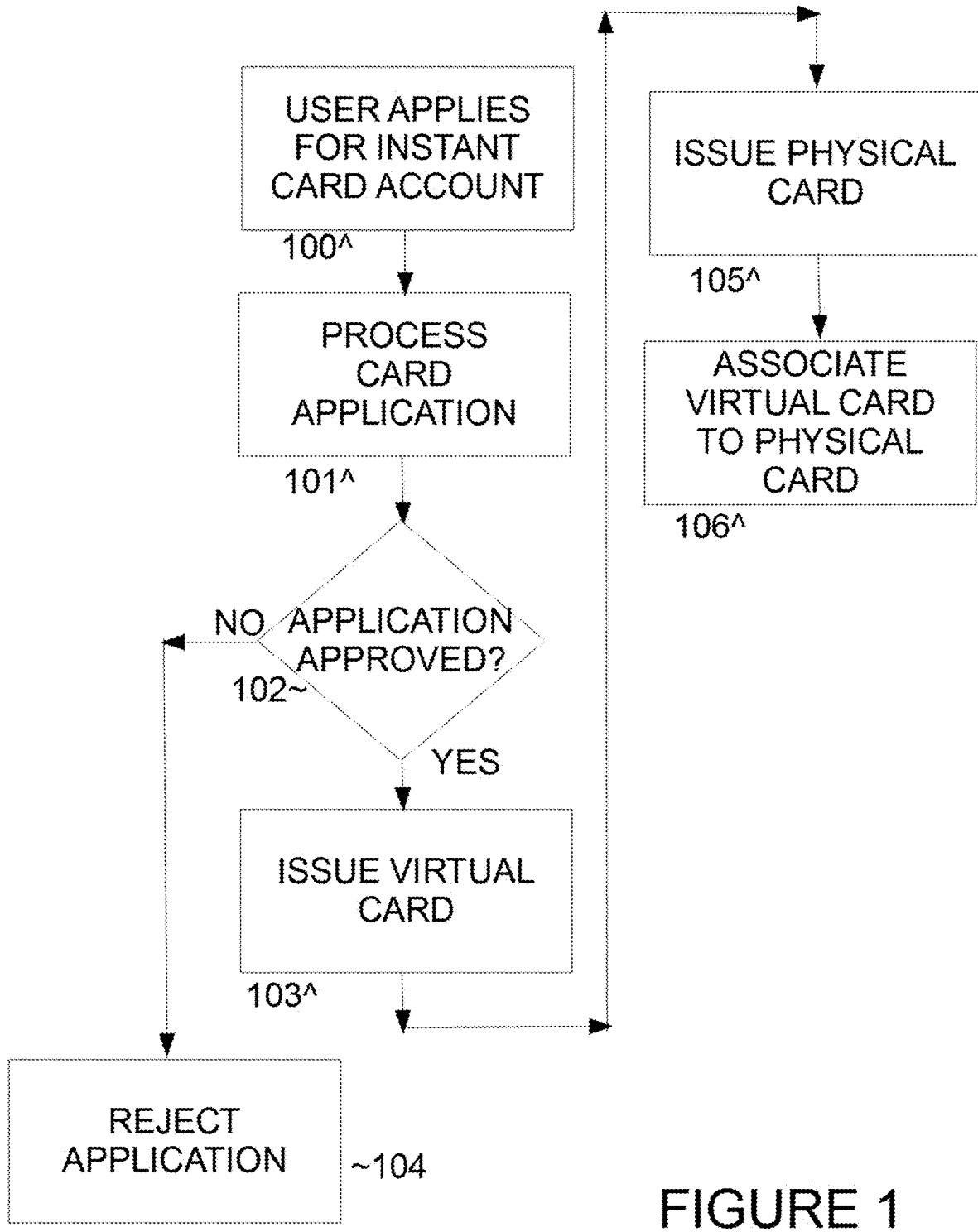
FIG. 1 is a flowchart illustrating an exemplary method for providing an instantaneous virtual card and associating it with a physical card, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement providing a user with an instant credit card and thereafter associating the instant credit card with a real, physical credit card associated with the same account.

A user (e.g., a consumer) can apply for a virtual card (e.g., a virtual credit card, virtual debit card, etc.) anywhere (e.g., in line at a checkout counter, at home, using a mobile device at any location, etc.). The virtual card can be used just as if it were a real card (e.g., physical credit card, debit card, etc.). The only difference is that the virtual card cannot be swiped since it does not really exist. Instead, the virtual card would have a card number, just as any physical card number would, which can be typed into a computer (or other credit card processor) and used in that manner. The virtual card can be displayed on a personal computing device using an app. A physical card can be mailed (or otherwise delivered) to the user so ultimately the user can use either the physical card or the virtual card to make transactions.

FIG. 1 is a flowchart illustrating an exemplary method for providing an instantaneous virtual card and associating it with a physical card, according to an embodiment.

The method can begin with operation 100, in which a user applies for an instant card. The instant card can be a number of different types of cards, such as a credit card, a debit card, a stored value card, a bitcoin card, or any other such paradigm. Note that as used herein, when the card is a credit card then physical card refers to a physical credit card and virtual card refers to a virtual credit card. When the card is a debit card then physical card refers to a physical debit card and virtual card refers to virtual debit card. When the card is a stored value card then physical card refers to a physical stored value card and virtual card refers to a virtual stored value card. When the card is a bitcoin card, then physical card refers to a physical bitcoin card and virtual card refers to a virtual bitcoin card. "Card" used by itself can refer to both a physical and virtual card.

A credit card can be a VISA®, MASTERCARD®, AMERICAN EXPRESS®, DISCOVER®, or a card which can be accepted at millions of locations worldwide. A transaction with such a card is charged against a credit account owned by the user to which the user should pay off (either immediately or over time along with an interest surcharge).

A debit card is a card in which is associated with a bank account and can also be associated with VISA®, MASTERCARD®, etc., but the money actually is debited out of the user's bank account and no credit is used. A processor would process the transaction using the VISA® or MASTERCARD® infrastructure but instead of the amount being further processed by a credit card the amount is processed by the user's bank (issuer of the debit card) to deduct the respective amount.

A stored value card actually stores any value on the card itself Examples of stored value cards are transit system fare-cards, cafeteria cards, etc. Since the value is stored on the card itself, there is no need for a remote server to query in order to check on the value of the card. Data representing the value on a stored value card would be encrypted and stored on the stored value card. A virtual stored value card would store the same data that would be stored on a physical stored value card but on a computer memory (e.g., flash memory on a mobile phone) where it can be transmitted to a stored value card reader.

A bitcoin card is a card that operates like a VISA®, MASTERCARD®, etc., but the funds are paid from a bitcoin account that is funded in bitcoins. Bitcoins are a well-known cryptocurrency. In this manner, charges made by the card are not paid for in dollars but are taken in bitcoins from the user's account (which can be a bit coin wallet). When a charge is made, the amount bitcoins equivalent to the charge would be automatically sold in order to fund the charge made.

In operation 100, the application for a card (actually an account which will issue a virtual card instantly and a physical card in the near future (such as in 24 hours the physical card can be mailed) can be done in a number of ways. For example, the user can use an internet-connected home computer (or personal computing device such as a cell phone, tablet, smart watch, etc.) and apply online (either using the World Wide Web or using an app). The user can also be at a retail establishment and the cashier can fill out an application for the user (by asking for the user's application information and entering application information into a terminal). The application information is information needed to process the application and render a decision, which comprises the user's name, address, social security number, employer, annual salary, etc.

Note that different types of cards may have a different application process. For example, different types of cards may require different information in the application. A credit card application would require the user to enter his/her income, while a debit card application would typically not need this information.

From operation 100, the method proceeds to operation 101, which processes the application by a processing server. The application information is transmitted to the processing server which retrieves respective information from one or more databases and evaluates the information and renders a decision whether to approve or deny the application.

Each different type of card would have a different evaluation process. For example, if the card being applied for is a credit card, then the user's credit worthiness is evaluated. The processing of the evaluation for a virtual credit card takes a number of data points and uses a weighted average to determine whether or not to approve the credit application. For example, factors such as the user's current salary, current credit score, age, etc., can all be put into a formula which takes a weighted average of each factor and then, if the final result is above a particular threshold, the application is approved otherwise it is denied. Or as another example, if certain factors all meet minimum requirements, then the application is approved otherwise the application is denied. For example, an application must have a credit score of at least 700 and a current income of at least 50,000 and if both of these factors are met then the application is approved, otherwise the application is denied. In addition to an approval/denial, the processing server also determines how much of a credit limit to grant to the user. This can be determined also by a formula. For example, the credit limit can be $1,000+(current income>30,000)*10% with a cap of $10,000. In other words, the minimum credit limit that a user can get is $1,000, a maximum credit limit that a user can get is $10,000 and for every dollar in income the user makes in excess of 30,000 (e.g., user's current income—30,000) the credit line will be increased by $0.10 (i.e., ten cents). So, a user who makes $50,000 will be given a credit line of $1,000+(50,000−30,000)*0.10=$3,000.

If the card being applied for is a debit card, then the processing server would evaluate whether the user has a valid and funded bank account to which the virtual debit card can draw from. If the card being applied for is a bitcoin card, then the processing server would evaluate whether the user has an active bitcoin wallet with a minimum value of bitcoins (e.g., $5.00).

In operation 102, if the application is denied, then the method proceeds to operation 104, which rejects the application by presenting the player with a message that his/her application was denied and then the method ends.

Figure 2:
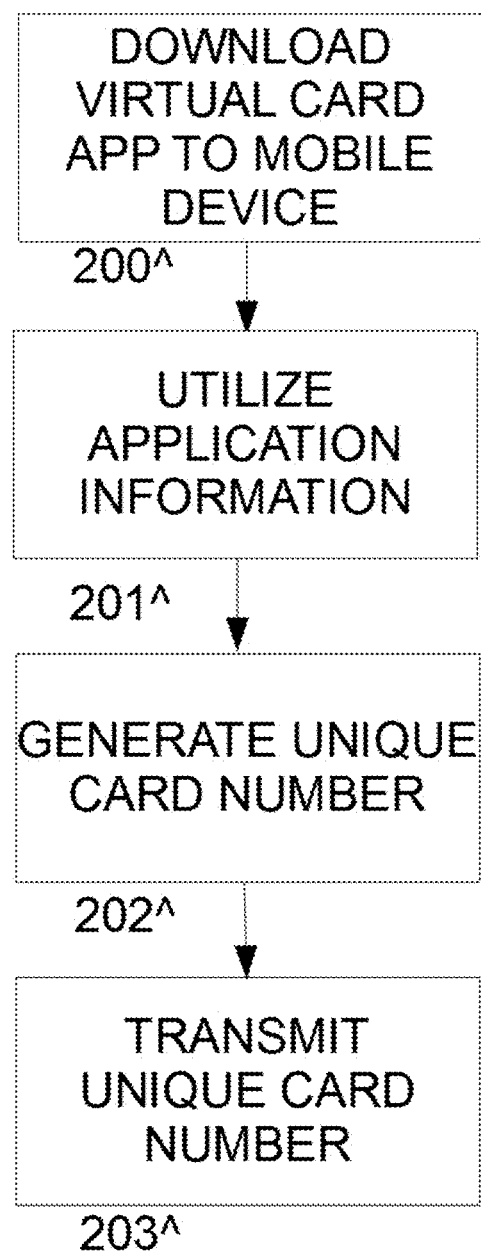
FIG. 2 is a flowchart illustrating an exemplary method of installing a virtual card on a mobile device, according to an embodiment.

If in operation 102, the application is approved, then the method proceeds to operation 103, which issues to the player a virtual card (see FIG. 2 and its accompanying description). The user's personal computing device (e.g., mobile phone, personal computer, tablet, smart watch, etc.) would receive the approval from processing server. The processing server would transmit to the user's computing device all information needed regarding the new virtual card, including such things like the bank name, card number (e.g., credit card number or debit card number), expiration date, CVV number, and any other relevant information. An app can be running on the user's computing device which can "construct" a virtual card (see FIG. 3).

If the virtual card is a virtual credit card, it can now be used like a regular credit card (e.g., it can be a VISA® or MASTERCARD® or other such classification). While the virtual card cannot be swiped because it does not physically exist, nevertheless the credit card number on the virtual card can be used for purchases like any other physical card. They can be typed into order forms, credit card machines, etc., along with the expiration date (and optionally the CVV number) and the transaction will be processed as if the virtual card was a normal card.

The virtual credit card can thus be used at many different merchants (e.g., anywhere VISA®/MASTERCARD® is accepted) and is not limited to being used at a particular store or chain of stores. Compare this to a store card, for example in which one can go to a merchant Acme Tools and apply for an in-store credit account and can receive an Acme Tools credit card subsequently in the mail. However, this Acme Tools credit card can only be used at Acme Tools stores and no other merchant (it is not a VISA® or MASTERCARD®).

If the card is a virtual debit card, it can be used as if it was any standard credit card (accepted wherever VISA®, MASTERCARD®, DISCOVER®, etc. are accepted). The user can present the number on the card (or an app displaying the card) and the card shown can also be used like any credit card (by typing in the number) but the money for each charge is deducted from the user's bank account (as opposed to being applied to a credit account as in the case of a credit card).

If the card is a virtual stored value card, then it can be used as if it was any stored value card. Stored value cards can encrypt information on the card which designated how much value is on the card. Using an app in place of a stored value card would work similarly, but the app would receive (e.g., via a communication device such as Bluetooth, etc.) communications from a stored value kiosk which records the data from the kiosk and can transmit such data when the user wishes to present the virtual stored value card for payment. The app would receive, store, and transmit, and data that would have been stored on a physical stored value card.

If the card is a bitcoin card, then the virtual bitcoin card could be used as any virtual credit card (e.g., by presenting the card number which can be entered into a computer) which functions like a physical bitcoin card (in which the funds are taken from the user's bitcoin wallet).

From operation 103, the method proceeds to operation 105, which issues a physical card to the user. The physical card will have printed on it the same information as the virtual card (e.g., number, name, expiration date, CVV number, etc.) and can be mailed to the user. The physical card can look identical in appearance to how the virtual card would be displayed on the personal computing device.

From operation 105, the method proceeds to operation 106, which associates the virtual card to the physical card. The user can activate the physical card in numerous ways, such as calling a number to confirm the card was received, going to a web site and answering security questions, etc. The account that maintains the virtual card will be updated to reflect that the physical card was mailed to the user and activated. Thus, the virtual card and the physical card will both be linked to the same account. Whether the virtual card or the physical card is used would not matter as the debits would be processed by the same account. Only one statement would be mailed (or transmitted electronically) to the user which would contain transactions from both the physical card and the virtual card.

Thus, the virtual version of the physical card will have the same functionality of the physical card (with the exception that the virtual card cannot be swiped) and the virtual and physical cards can be used interchangeably with no difference in effect.

FIG. 2 is a flowchart illustrating an exemplary method of installing a virtual card on a mobile device, according to an embodiment. This is performed during operation 103 in FIG. 1.

In operation 200, an app that is running on a user's personal computing device is downloaded. This app allows the receiving of encrypted information from the processing server and enables the virtual card to be displayed on the computing device (see FIG. 3).

In operation 201, the processing server will utilize the application information received from the user (e.g., the user's name, address, social security number, etc.) to generate a new record for a new virtual card.

From operation 201, the method proceeds to operation 202, wherein the processing server will generate a new and unique card number. This is the number that is used when a charge is made to identify the card and is printed on physical cards themselves. For example, in the case of a credit card, the unique card number is the credit card number that is typically printed on the face of the physical credit card (and also displayed on the virtual credit card as well). The processing server can also generate a CVV code (a three-digit code which can be required during a transaction as an extra level of security), an expiration date, and any other data which is needed to generate a new physical card. Different types of cards would require different types of attributes (for example, a stored value card may not need a CVV code).

From operation 202, the method proceeds to operation 203, which transmits the unique card number generated in operation 202 to the app running on the mobile device. The app can then use this information and generate an image of the virtual card on the mobile device (See FIG. 3).

Figure 3:
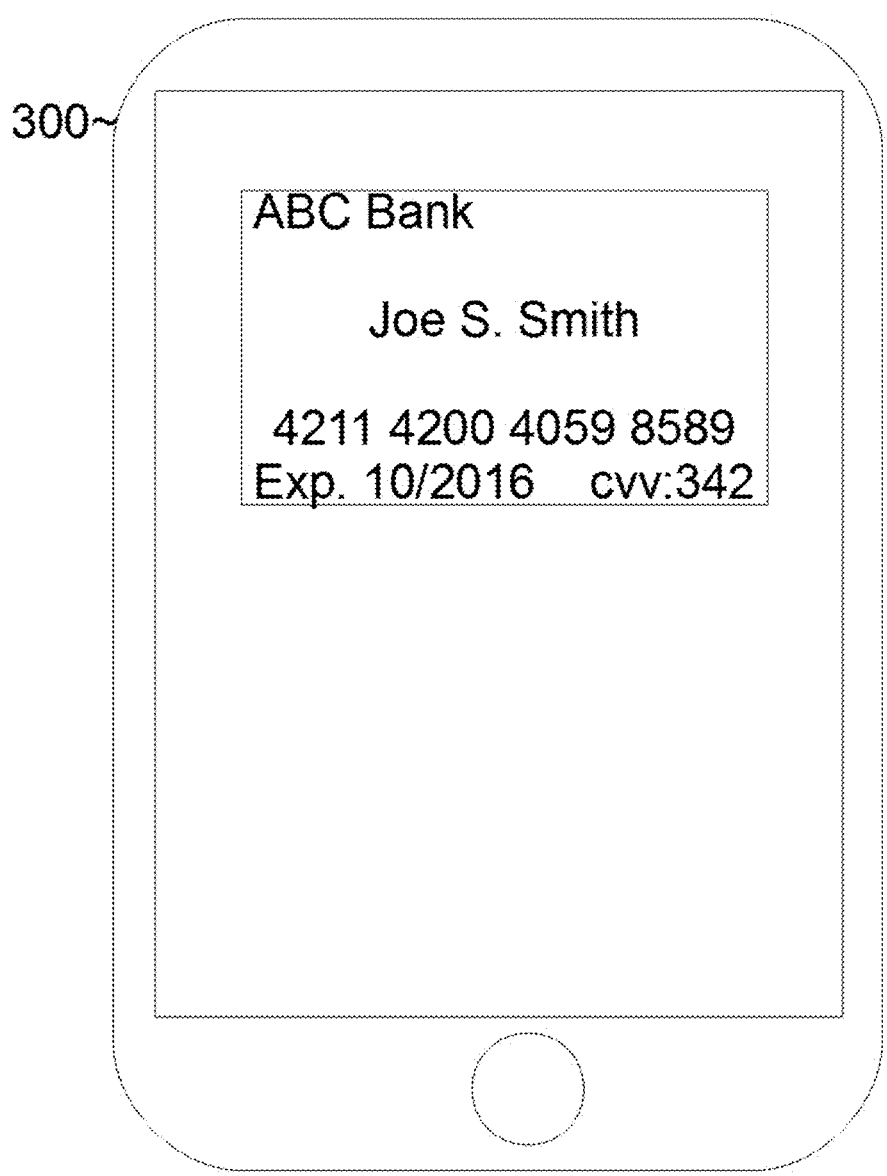
FIG. 3 is a drawing of a virtual card on a mobile device, according to an embodiment.

FIG. 3 is a drawing of a virtual card on a mobile device, according to an embodiment.

A personal computing device 300 (in this case a tablet) is running an app which displays an image of a virtual credit card. The image will look like a standard credit card, complete with bank logo, credit card number, expiration date, etc. While FIG. 3 shows an example of a virtual credit card, the other types of cards (e.g., debit card, stored value card, bitcoin card, etc.) would be displayed and utilized similarly. While FIG. 3 displays a virtual credit card, a virtual debit card, virtual stored value card, virtual bitcoin card would be displayed similarly (showing any information that the respective type of card would have on its face).

The app can mimic a chip card (or EMV card) and handle all communications that a chip card would process, using input/output protocols such as Bluetooth, Wi-Fi, RFID, etc. A chip card encrypts information and transmits it to the terminal and vice versa, thus verifying the authenticity of the chip card and also maintaining the privacy of the card number (e.g., credit card number for a credit card, debit card number for a debit card, etc.). The app running on the personal computing device can implement the virtual card which can work with these terminals in the same manner that the physical card would handle such a transaction (assuming the terminal has a sufficient method of communications (e.g., Wi-Fi, RFID, Bluetooth, tee.) to communicate with the app running on the personal computing device since of course the personal computing device cannot be inserted into the terminal as would a standard physical chip card.

FIG. 4 is a drawing of a credit card statement combining charges from both the physical and virtual credit card, according to an embodiment. The statement can be printed on paper or electronically displayed on an electronic output device. Note that while FIG. 4 illustrates a credit card account (utilizing a virtual card and a physical card), such a statement can be generated for any other type of card (e.g., debit card, stored value card, bitcoin card, etc.) with the transactions from both the virtual and physical cards merged.

Note that the example statement 401 looks like a standard credit card statement, with the only difference being the last column shows whether the charge shown was incurred via the virtual card or the physical card. When the physical card is presented to a merchant then it would be labeled as "physical" while when a purchase is made using the app or just by utilizing the credit card number (e.g., ordering online) then it would be labeled as "virtual."

Figure 5:
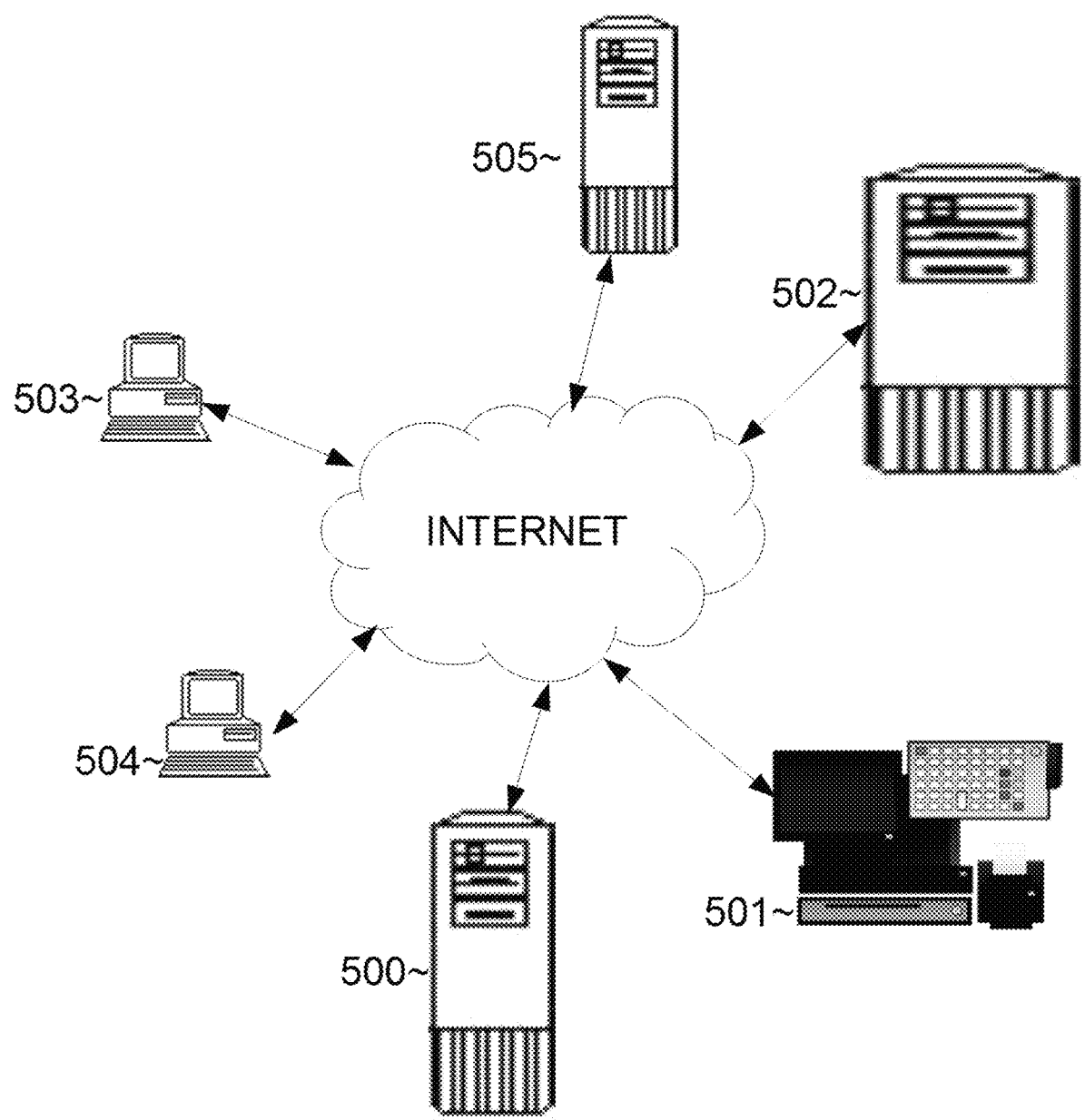
FIG. 5 is a block diagram illustrating participants of the system, according to an embodiment.

FIG. 5 is a block diagram illustrating participants of the system, according to an embodiment.

Processing server 500 is used to receive new card applications (see operation 101) and process them by evaluating the information in the application and determining whether the applicant is a good risk (in which the application is accepted) or an unworthy risk (in which the application is rejected). The decision is typically determined and communicated to the applicant (and other involved parties) by the processing server 500 instantaneously. Point of sale terminal 501 is where a user can make an application for a virtual card (see operation 100). Point of sale terminal 501 is also where the user can use his physical credit card and/or his/her virtual card. Remote users 503, 504 can also apply for the virtual card remotely (as opposed to in person at a point of sale terminal 501) on their personal computing device (the application of which is then transmitted to the processing server 500). Authorization server 502 is a server which receives card authorization requests and either approves or declines them based on whether the card number used is valid and there are adequate funds left on that card. When a user makes a purchase using their card (e.g., credit card), whether it be physical or virtual, at a point of sale terminal 501 or online (e.g., a purchase from AMAZON.COM®) an authorization request is transmitted to the authorization server 502 (there can be many such servers operating simultaneously) to approve or deny such request. If the authorization request is denied, then any transaction contingent upon such approval will not be processed. If the authorization request is approved, then the transaction can be completed. The remote users 503, 504 will also receive their statements (e.g., monthly) from a bank server 505 which administers the card account. When the authorization server 502 is queried whether to approve a transaction or not it may have to be routed to the bank server 505 which would then make the final determination of whether the credit authorization (which includes an amount of the requested purchase) should be approved or not. The bank server 505 may have access to information that the authorization server 502 may not, such as the value of bank accounts or how much credit is left on a credit account.

In the case of a credit card, an authorization would be approved if the account associated with the credit card is in good standing (not past due) and the available credit on the credit card account is greater (or greater than equal) to the amount of the requested purchase, otherwise the authorization request would be denied. In the case of a debit card, an authorization would be approved if the account associated with the debit card is in good standing and has sufficient funds to cover the purchase amount (embedded in the authorization request). In the case of a stored value card, typically the authorization server 502 would not be required as a stored value card would not need to be authorized by an outside entity. In the case of a bitcoin card, the authorization request would be approved if the dollar value of the bitcoins in the associated bitcoin wallet is greater than or equal to the amount of the authorization request.

Figure 6:
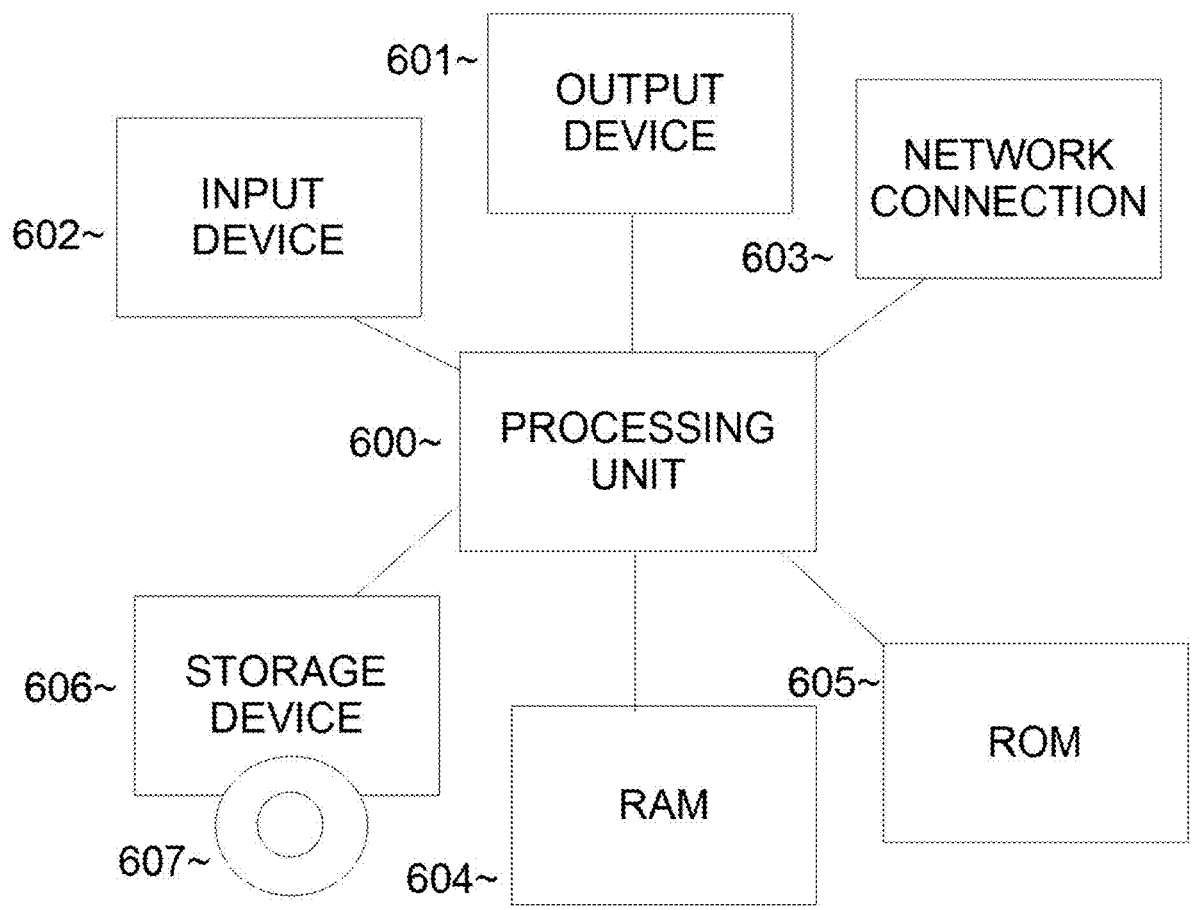
FIG. 6 is a block diagram illustrating hardware that can be used to implement a computer/device which can implement any and all of the methods described herein.

FIG. 6 is a block diagram illustrating hardware that can be used to implement a computer/device which can implement any and all of the methods described herein. The computer can be the platform, any server, personal computing device, cell phones, or any electronic device used as part of the system. Any and all of the methods described herein can be installed as software on the device.

A processing unit 600 (such as a microprocessor and any associated components) is connected to an output device 601 (such as an LCD monitor, touch screen, CRT, etc.) which is used to display to the user any aspect of all methods described herein (including any values described herein), and an input device 602 (e.g., buttons, a touch screen, a keyboard, mouse, etc.) which can be used to input from the user any input needed by any feature described herein. All methods and features described herein can be performed by the processing unit 600 by loading and executing respective instructions. The processing unit 600 can also be connected to a network connection 603, which can connect the processing unit 600 to a computer communications network such as the Internet, a LAN, WAN, etc. and transmit/receive all data (whether described herein or not). The processing unit 600 is also connected to a RAM 604 and a ROM 605. The processing unit 600 is also connected to a storage device 606 which can be a DVD-drive, CD-ROM, flash memory, etc. Multiple such processing units can also work in collaboration with each other (in a same or different physical location). A non-transitory computer readable storage medium 607 can store a program which can control the electronic device to perform any of the methods described herein and can be read by the storage device 606.

While one processing unit (or device/computer) is shown, it can be appreciated that one or more such processor/computer can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.) which can then be executed by one or more processing units.

All components of the system (e.g., platform, servers, computers, databases, etc.) can communicate with each other using a computer communication network (e.g., the internet) in order to exchange data as needed by the method.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a (non-transitory) computer readable storage medium to control a computer. Programs and/or data required to implement any of the methods/features described herein can all be stored (and executed therefrom to perform any of the methods/features) on any non-transitory computer readable storage medium (volatile or non-volatile, such as CD-ROM, RAM, ROM, EPROM, microprocessor cache, etc.).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer implemented method, the method comprising:

performing on one or more electronic processors, the following operations:

receiving a request to open a virtual chip card for a user;

approving the request for the virtual chip card;

generating a card number for the virtual chip card which is associated with an account of a user;

transmitting the card number for the virtual chip card to a personal computing device operated by the user and causing the virtual chip card to be installed on the personal computing device;

causing display of an image of the virtual chip card on a display screen of the personal computing device, wherein the image comprises a name of the user, the card number for the virtual chip card, and an expiration date assigned to the virtual chip card;

enabling the user to make a purchase using the virtual chip card, wherein the enabling comprises running software installed on the personal computing device which configures the virtual chip card installed on the personal computing device to perform an authentication process;

generating data used to generate a physical card that corresponds to the virtual card and is associated with the account, wherein the generating the data used to generate the physical card comprises generating an appearance of the physical card based on an appearance of the virtual chip card displayed on the display screen of the personal computing device;

issuing the physical card and enabling the user to make a purchase using the physical card; and generating a statement for the account and indicating whether a charge was incurred using the virtual chip card or the physical card.

2. The method as recited in claim 1, wherein both the virtual chip card and the physical card are a stored value card.

3. The method as recited in claim 1, further comprising enabling the user to utilize the virtual chip card at a point of sale terminal to make the purchase.

4. The method as recited in claim 3, wherein the installed software running on the personal computing device communicates with the point-of-sale terminal to authenticate the virtual chip card.

5. The method as recited in claim 4, further comprising using near field communication when the installed software running on the personal computing device communicates with the point of sale terminal.

6. An apparatus, comprising:
one or more servers;
a network connection connected to the one or more servers enabling communication to the internet;
the one or more servers comprising one or more electronic processing units, the one or more electronic processing units connected to at least one computer readable storage medium, the at least one computer readable storage medium storing instructions that when executed, cause the one or more servers to:
receive a request to open a virtual chip card for a user;
approve the request for the virtual chip card;
generate a card number for the virtual chip card which is associated with an account of the user;
transmit the card number for the virtual chip card to a personal computing device operated by the user and cause the virtual chip card to be installed on the personal computing device;
cause a display of an image of the virtual chip card on a display screen of the personal computing device, wherein the image comprises a name of the user, the card number for the virtual chip card, and an expiration date assigned to the virtual chip card;
enable the user to make a purchase using the virtual chip card, wherein the processor is configured to run software installed on the personal computing device which configures the virtual chip card installed on the personal computing device to perform an authentication process;
generate data used to generate a physical card that corresponds to the virtual card and which is also associated with the account of the user, wherein the generating the data used to generate the physical card comprises generating an appearance of the physical card based on an appearance of the virtual chip card displayed on the display screen of the personal computing device;
issue the physical card and enable the user to make a purchase using the physical card;
generate a statement for the account and indicating whether a charge was incurred using the virtual chip card or the physical card.

7. The apparatus as recited in claim 6, wherein the computer readable instructions are further programmed such that both the virtual chip card and the physical card are a stored value card.

8. The apparatus as recited in claim 6, wherein the computer readable instructions are further programmed to enable the user to utilize the virtual chip card at a point of sale terminal to make the purchase.

9. The apparatus as recited in claim 8, wherein the computer readable instructions are further programmed to cause the software installed running on the personal computing device to be programmed to communicate with the point-of-sale terminal to authenticate the virtual chip card.

10. The apparatus as recited in claim 9, wherein the computer readable instructions are further programmed to use near field communication when the installed software running on the personal computing device communicates with the point of sale terminal.

11. The apparatus as recited in claim 6, wherein the computer readable instructions are further programmed to generate a CVV number for the virtual chip card.

12. A method comprising:
transmitting a card number to a personal computing device operated by a user;
causing a virtual chip card assigned to the card number to be installed on the personal computing device;
causing display of an image of the virtual chip card on a display screen of the personal computing device wherein the image comprises a name of the user, the card number for the virtual chip card, and an expiration date assigned to the virtual chip card;
enabling the user to make a purchase using the virtual chip card, wherein the enabling comprises running software installed on the personal computing device which configures the virtual chip card installed on the personal computing device to perform an authentication process;
generating data used to generate a physical card that corresponds to the virtual card and is associated with the account, wherein the generating the data used to generate the physical card comprises generating an appearance of the physical card based on an appearance of the virtual chip card displayed on the display screen of the personal computing device;
issuing the physical card and enabling the user to make a purchase using the physical card; and
collecting transactions submitted by the virtual chip card and the physical card over a period of time; and
generating a statement for the user over the period of time which includes information about the transactions and indicator values indicating whether the transactions were submitted from the virtual chip card or the physical card.

13. The method as recited in claim 12, wherein both the virtual chip card and the physical card are a stored value card.

14. The method as recited in claim 12, further comprising enabling the user to utilize the virtual chip card at a point-of-sale terminal to make the purchase.

15. The method as recited in claim 14, wherein the installed software running on the personal computing devices communicates with the point-of-sale terminal to authenticate the virtual chip card.

16. The method as recited in claim 15, further comprising using near field communication when the installed software running on the personal computing device communicates with the point of sale terminal.

17. The method as recited in claim 12, wherein the method further comprises generating a CVV number for the virtual chip card.

* * * * *